(12) United States Patent
Hecht et al.

(10) Patent No.: US 9,779,722 B2
(45) Date of Patent: Oct. 3, 2017

(54) SYSTEM FOR ADAPTING SPEECH RECOGNITION VOCABULARY

(71) Applicant: GM GLOBAL TECHNOLOGY OPERATIONS LLC, Detroit, MI (US)

(72) Inventors: Ron M. Hecht, Raanana (IL); Omer Tsimhoni, Ramat Hasharon (IL); Timothy J. Grost, Clarkston, MI (US)

(73) Assignee: GM Global Technology Operations LLC, Detroit, MI (US)

(*) Notice: Subject to any disclaimer, the term of this patent is extended or adjusted under 35 U.S.C. 154(b) by 166 days.

(21) Appl. No.: 14/072,679

(22) Filed: Nov. 5, 2013

(65) Prior Publication Data

US 2015/0127326 A1     May 7, 2015

(51) Int. Cl.
*G06F 17/20*  (2006.01)
*G06F 17/28*  (2006.01)
*G10L 15/065*  (2013.01)
*G06F 17/27*  (2006.01)
*G10L 15/07*  (2013.01)
*G10L 15/06*  (2013.01)

(52) U.S. Cl.
CPC .......... *G10L 15/065* (2013.01); *G06F 17/20* (2013.01); *G06F 17/2735* (2013.01); *G06F 17/28* (2013.01); *G06F 17/289* (2013.01); *G10L 15/07* (2013.01); *G10L 2015/0635* (2013.01)

(58) Field of Classification Search
USPC ...................................... 704/1–10
See application file for complete search history.

(56) References Cited

U.S. PATENT DOCUMENTS

| | | | | |
|---|---|---|---|---|
| 5,794,204 A * | 8/1998 | Miyazawa | ............ | G10L 15/075 704/244 |
| 5,933,804 A * | 8/1999 | Huang | .................. | G10L 15/063 704/244 |
| 6,163,768 A * | 12/2000 | Sherwood | ............. | G10L 15/063 704/235 |
| 6,212,498 B1 * | 4/2001 | Sherwood | ............. | G10L 15/063 704/235 |
| 6,243,669 B1 * | 6/2001 | Horiguchi | ............. | G06F 17/271 704/257 |
| 6,266,642 B1 * | 7/2001 | Franz | .................... | G06F 17/271 704/257 |
| 6,374,210 B1 * | 4/2002 | Chu | .................... | G06F 17/2863 704/9 |
| 6,434,524 B1 * | 8/2002 | Weber | ....................... | G06F 3/16 704/10 |
| 6,804,645 B1 * | 10/2004 | Kleinschmidt | ..... | G06F 17/2795 704/243 |

(Continued)

*Primary Examiner* — Pierre-Louis Desir
*Assistant Examiner* — Seong Ah A Shin
(74) *Attorney, Agent, or Firm* — John A. Miller; Miller IP Group, PLC

(57) ABSTRACT

A system and method for adapting a speech recognition and generation system. The system and method include providing a speech recognition and generation engine that processes speech received from a user and providing a dictionary adaptation module that adds out of vocabulary words to a baseline dictionary of the speech recognition and generation system. Words are added by extracting words that are encountered and adding out of vocabulary words to the baseline dictionary of the speech recognition and generation system.

17 Claims, 4 Drawing Sheets

(56) References Cited

U.S. PATENT DOCUMENTS

| | | | |
|---|---|---|---|
| 7,275,033 B1* | 9/2007 | Zhao | G10L 15/197 704/255 |
| 7,725,316 B2 | 5/2010 | Chengalvarayan | |
| 7,827,165 B2* | 11/2010 | Abernethy, Jr. | G06F 17/2735 707/708 |
| 7,840,405 B1* | 11/2010 | Lee | G06F 17/30654 704/231 |
| 8,060,357 B2* | 11/2011 | Segond | G06F 17/2247 704/1 |
| 8,457,959 B2* | 6/2013 | Kaiser | G10L 15/24 704/231 |
| 8,712,776 B2* | 4/2014 | Bellegarda | G10L 13/08 704/258 |
| 8,990,083 B1* | 3/2015 | Gannu | G10L 15/06 704/240 |
| 2002/0135618 A1* | 9/2002 | Maes | G06F 3/0481 715/767 |
| 2002/0194004 A1* | 12/2002 | Glinski | G10L 15/197 704/270.1 |
| 2004/0102957 A1* | 5/2004 | Levin | G06F 17/2735 704/3 |
| 2004/0261021 A1* | 12/2004 | Mittal | G06F 3/0237 715/256 |
| 2005/0154580 A1* | 7/2005 | Horowitz | G06F 17/271 704/9 |
| 2005/0209844 A1* | 9/2005 | Wu | G06F 17/2223 704/2 |
| 2005/0246365 A1* | 11/2005 | Lowles | G06F 1/1626 |
| 2006/0230350 A1* | 10/2006 | Baluja | G06F 3/0237 715/700 |
| 2007/0033005 A1* | 2/2007 | Cristo | G06F 17/279 704/9 |
| 2007/0074131 A1* | 3/2007 | Assadollahi | G06F 3/0237 715/816 |
| 2007/0265831 A1* | 11/2007 | Dinur | G06F 17/273 704/10 |
| 2008/0005064 A1* | 1/2008 | Sarukkai | G06F 17/241 |
| 2008/0052071 A1* | 2/2008 | Doulton | H04M 3/4936 704/235 |
| 2008/0294637 A1* | 11/2008 | Liu | G06F 17/30861 |
| 2009/0254817 A1* | 10/2009 | Dreyfus | G06F 17/2735 715/257 |
| 2010/0036666 A1* | 2/2010 | Ampunan | G10L 15/187 704/251 |
| 2010/0114887 A1* | 5/2010 | Conway | G06F 3/0237 707/737 |
| 2010/0153324 A1* | 6/2010 | Downs | G06F 17/2745 706/21 |
| 2011/0010174 A1* | 1/2011 | Longe | G10L 15/24 704/235 |
| 2011/0238410 A1* | 9/2011 | Larcheveque | G06F 17/2785 704/9 |
| 2012/0053935 A1* | 3/2012 | Malegaonkar | G10L 15/07 704/235 |
| 2012/0116766 A1* | 5/2012 | Wasserblat | G10L 15/08 704/254 |
| 2012/0179471 A1* | 7/2012 | Newman | G10L 15/30 704/270.1 |
| 2013/0030804 A1* | 1/2013 | Zavaliagkos | G10L 15/26 704/235 |
| 2013/0030810 A1* | 1/2013 | Kopparapu | G06F 17/30873 704/260 |
| 2013/0191112 A1* | 7/2013 | Fux | G06F 17/275 704/8 |
| 2013/0262106 A1* | 10/2013 | Hurvitz | G10L 15/183 704/235 |
| 2014/0136200 A1* | 5/2014 | Winter | G10L 15/07 704/244 |
| 2014/0149119 A1* | 5/2014 | Sak | G06F 17/2775 704/260 |
| 2014/0163954 A1* | 6/2014 | Joshi | G06F 17/276 704/9 |
| 2014/0172418 A1* | 6/2014 | Puppin | G06F 17/2735 704/10 |
| 2015/0100240 A1* | 4/2015 | Toopran | G01C 21/3608 701/539 |
| 2015/0127326 A1* | 5/2015 | Hecht | G10L 15/065 704/10 |

* cited by examiner

SYSTEM FOR ADAPTING SPEECH RECOGNITION VOCABULARY

BACKGROUND OF THE INVENTION

Field of the Invention

This invention relates generally to a system and method for adapting a speech recognition vocabulary and, more particularly, to a system and method for adding a dictionary adaptation module to a speech recognition and generation engine or system that analyzes dialog and suggests words that may be added to a dictionary of the speech recognition and generation engine or system.

Discussion of the Related Art

Speech recognition systems enable microphone-equipped computing devices to interpret speech and thereby provide an alternative to conventional human-to-computer input devices such as keyboards or keypads. A typical speech recognition system includes a microphone and an acoustic interface that receives a user's speech and digitizes it into acoustic data. Also included, for example, is an acoustic pre-processor that parses the acoustic data into information with acoustic features and a decoder that uses acoustic models to decode the acoustic features and generate at least one hypotheses, which can include decision logic to select a best hypothesis of subwords and words corresponding to the user's speech.

Speech recognition systems for natural utterances typically use fixed word dictionaries. The size of the dictionary has an immediate effect on the accuracy and speed of speech recognition, where small dictionaries reduce confusion among words and require less resources, such as CPU and memory, and large dictionaries have good coverage of the language such that many words may be considered for any utterance.

Some known approaches to dictionary definitions include narrow sets of predefined messages, such as canned messages, small dictionaries and large dictionaries. With small dictionaries, for example, 1,000 or less words, many words are outside of the dictionary and thus cannot be recognized, i.e., many words are Out Of Vocabulary (OOV). With large dictionaries, for example, 20,000 or more words, there is a higher probability that the spoken words are found in the dictionary and thus are recognizable. However, there is also a higher probability of word confusion with large dictionaries. Thus, there is a need in the art for a dictionary adaptation module for a speech recognition and generation engine that allows for a balance between maintaining a small dictionary and preventing OOV by achieving a reasonable coverage of the expected word that is uttered.

SUMMARY OF THE INVENTION

In accordance with the teachings of the present invention, a system and method for adapting a speech recognition and generation system is disclosed. The system and method include providing a speech recognition and generation engine that processes speech received from a user and providing a dictionary adaptation module that adds out of vocabulary words to a baseline dictionary of the speech recognition and generation system. Words are added by extracting words that are encountered and adding out of vocabulary words to the baseline dictionary of the speech recognition and generation system.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for adding an analysis module to a speech recognition and generation engine or system is merely exemplary in nature, and is in no way intended to limit the invention or its applications or uses.

As stated above, there is a need to find the right balance between maintaining a dictionary of a speech recognition and generation engine small and preventing Out Of Vocabulary (OOV) issues by achieving a reasonable coverage of the expected word space. Currently, speech recognition engines have only limited dictionaries so as to narrow down the search space and to prevent confusion among words. For example, a comparison between a 1,000 word dictionary and a 2,000 word dictionary over a 6 word sentence reveals that the 2,000 word dictionary search space is 64 times bigger. Thus, the amount of word confusion is larger.

As is described in detail below, a dictionary adaptation system for a speech recognition and generation system is disclosed. OOV issues are prevented by suggesting words that can be added to the dictionary, as is described in more detail below. In a first stage, OOV words or OOV classes of words are extracted from an incoming communication, search data, social networking statuses, etc., and in a second stage the OOV words are added to the speech recognition dictionary.

Figure 1:
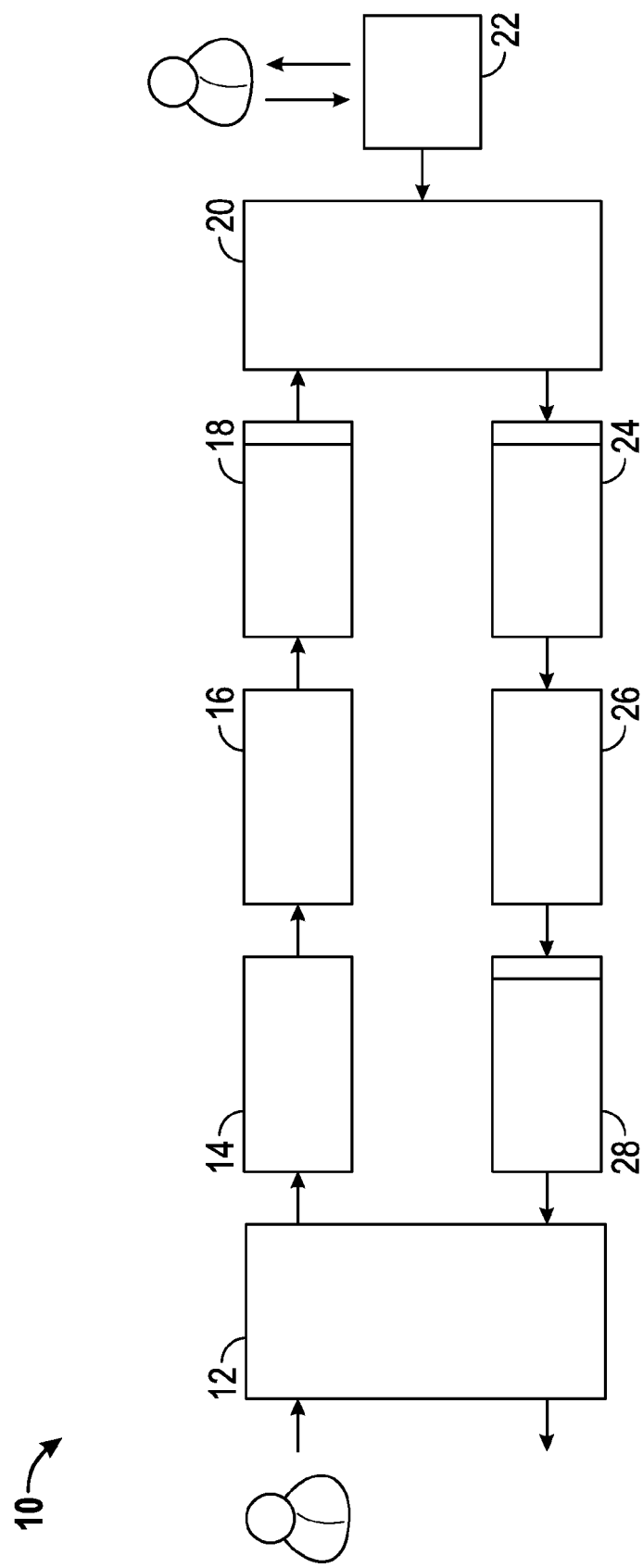
FIG. 1 is a block diagram of a speech recognition and generation system.

FIG. 1 is a block diagram of a typical speech recognition and generation system 10. The speech recognition and generation system 10 may be implemented in any of various ways known to those skilled in the art, such as in the form of a controller, microprocessor, microcontroller, host processor, vehicle communications processor, etc., that may or may not be part of a central processing unit. Block 12 is a user interface for a user to utilize the speech recognition and generation system 10. A "user" may be a person or a computational system such as a system that orders items such as movies and/or food, or that performs internet searches, updates social network statuses, etc. using messages. An acoustic processor 14 processes the basic sounds of the speech provided by the user. A speech recognizer 16 determines the word(s) uttered by the user, and a semantic parser 18 determines the meaning of the word(s) uttered by the user. A dialog controller 20 determines the words to generate using information from the semantic parser 18 and application content 22 that holds data relevant for the application. For example, when making a restaurant reservation, the application content 22 will be the names, location and price range of all the restaurants in a specific area. In texting, the application content 22 holds all the last communications with a specific user. The user's word(s) from the dialog controller 20 are sent to a message generator 24 and a speech synthesizer 26. The message is presented as an audio presentation by an audio presenter 28, and the message is also made available to the user at the user interface 12. A "message" as discussed herein may be any communication that is a text or text-like in nature. For example, text, SMS, MMS, internet query and search are all messages within the scope of the present invention. An example of a speech recognition system can be found in U.S. Pat. No. 7,725,316 entitled, "Applying Speech Recognition Adaptation in an Automated Speech Recognition System of a Telematics-Equipped Vehicle", issued May 25, 2010, assigned to the assignee of the present application and incorporated herein by reference.

Figure 2:
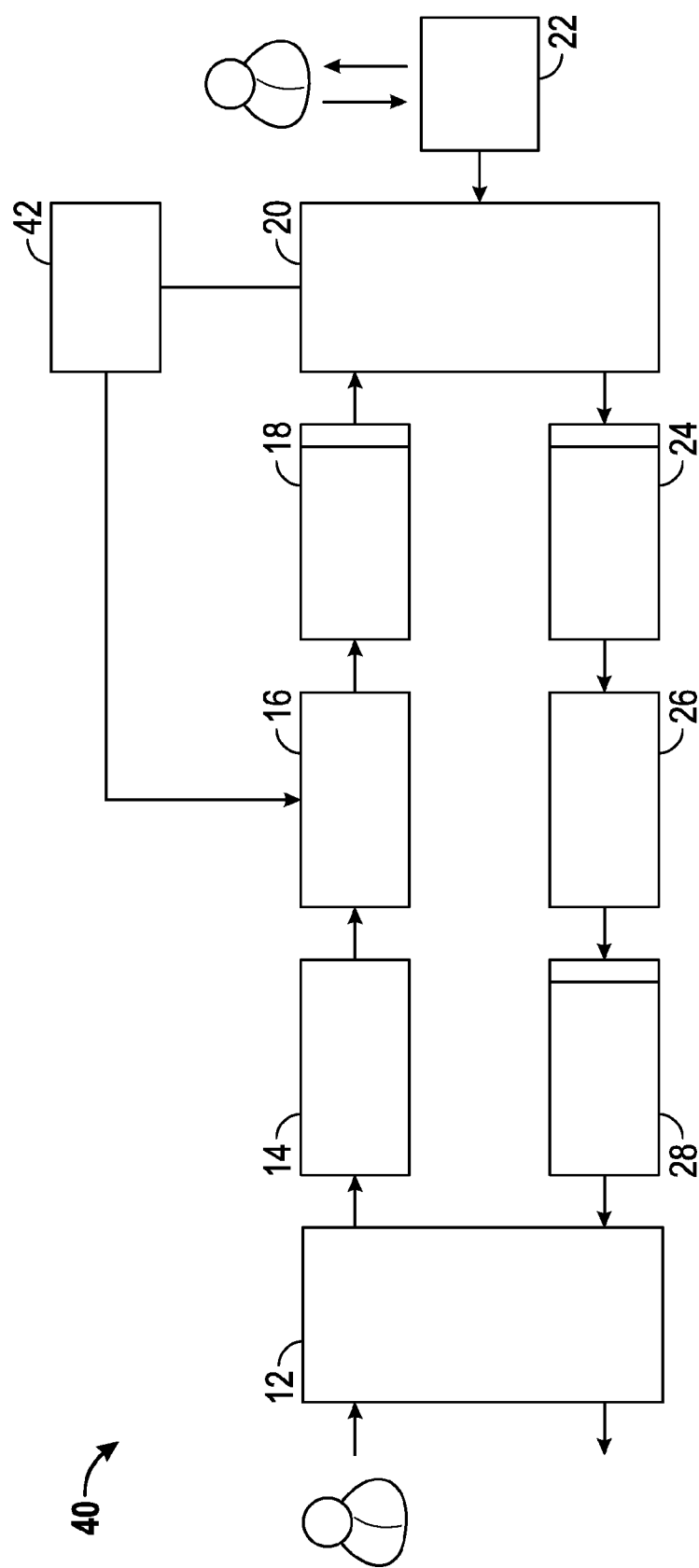
FIG. 2 is a block diagram of a speech adaptation and generation system with a dictionary adaptation module.

FIG. 2 is a block diagram of an embodiment of a speech recognition and generation system 40 where like elements utilize the same reference numerals of FIG. 1. A dictionary adaptation module 42 enables the vocabulary of the speech recognition and generation system 40 to be adapted by using additional sources of information that are generated from context. For example, when a driver or user dictates a text message, the dictionary adaptation module 42 uses past incoming messages and the identity of the partner, i.e., the person or system that the user is communicating with, to modify the speech recognition vocabulary by adding words not already in the vocabulary of the speech recognition and generation system 40 that are likely to be used in the dictated message. Thus, the system 40 is able to reduce out of vocabulary (OOV) mistakes while utilizing a relatively small dictionary, which requires less memory and CPU requirements compared to a large dictionary. Accordingly, the system 40 using the module 42 improves the accuracy of natural language dictation for complex messages rather than requiring the driver to choose among a small set of canned messages.

Figure 3:
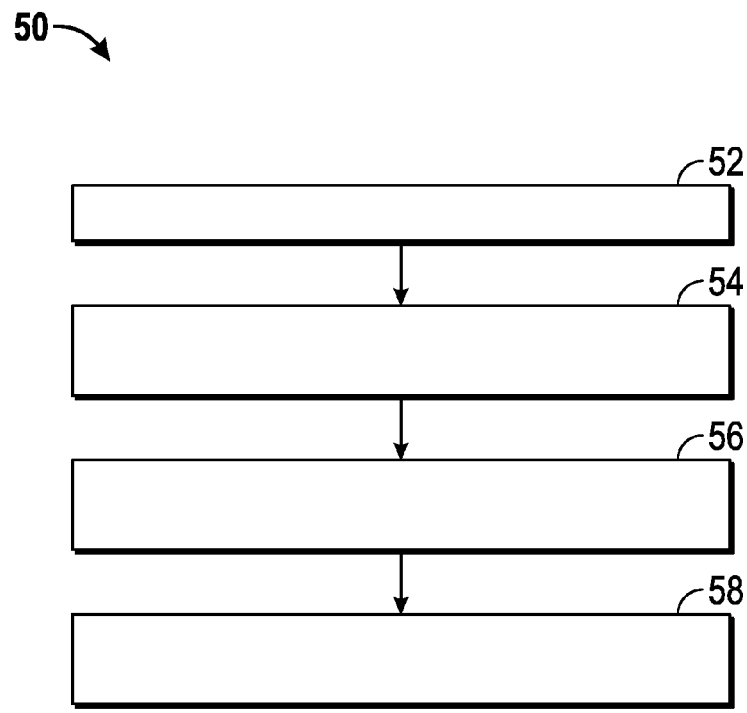
FIG. 3 is a flow diagram of an exemplary embodiment of the speech adaptation and generation system.

FIG. 3 is a flow diagram 50 of an example of how the speech recognition and generation system 40 may operate. At box 52, an incoming message arrives. The dictionary adaptation module 42 compares words from the incoming message with a baseline dictionary of the speech recognizer 16 at box 54, and new words that are not yet in the baseline dictionary that are in the incoming message are added to modify the baseline dictionary at box 56. The modified baseline dictionary is thereafter available for use by the system 40 at box 58.

Figure 4:
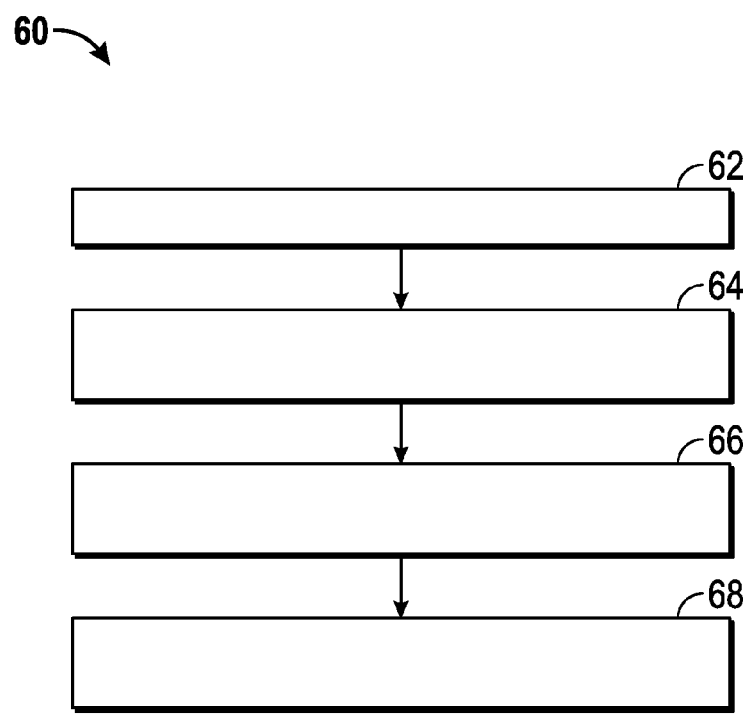
FIG. 4 is a flow diagram of a second embodiment of the speech adaptation and generation system.

FIG. 4 is a flow diagram 60 of a second example of how the speech recognition and generation system 40 operates. At box 62, an incoming message arrives. The dictionary adaptation module 42 compares words from the incoming message with sets of word groups in a baseline dictionary of the speech recognizer 16 at box 64. New groups of words that are not yet in the baseline dictionary are added to the baseline dictionary at box 66. For example, if the restaurant "McDonalds" is used between the sender and the receiver, a group of words that is a list of several restaurants may be added to the baseline dictionary. Thereafter, dictation of outgoing messages includes using the modified dictionary at box 68. The word groups may be predefined based on the subject of the message exchange, for example, sports, restaurants, movies, TV shows, etc. The word groups may also be defined based on the intent of the conversation as well, for example, planning to attend/meet, ordering tickets, providing or receiving instructions, etc. The word groups may be generated online based on co-occurrence over large populations.

As stated above, OOV issues may be prevented using the speech recognition and generation system 40 in many situations, such as internet searches and/or social network status updates, etc. For example, when a user searches the internet using speech and the user receives a certain result, the words in the result can be treated in a similar way that an incoming text is treated. In one example, when a user conducts a set of speech-based searches by vocalizing/dictating the desired query, the results of the first search may be analyzed and OOV words are added to the speech recognition engine dictionary. After each search any OOV words may be added to the dictionary.

Figure 5:
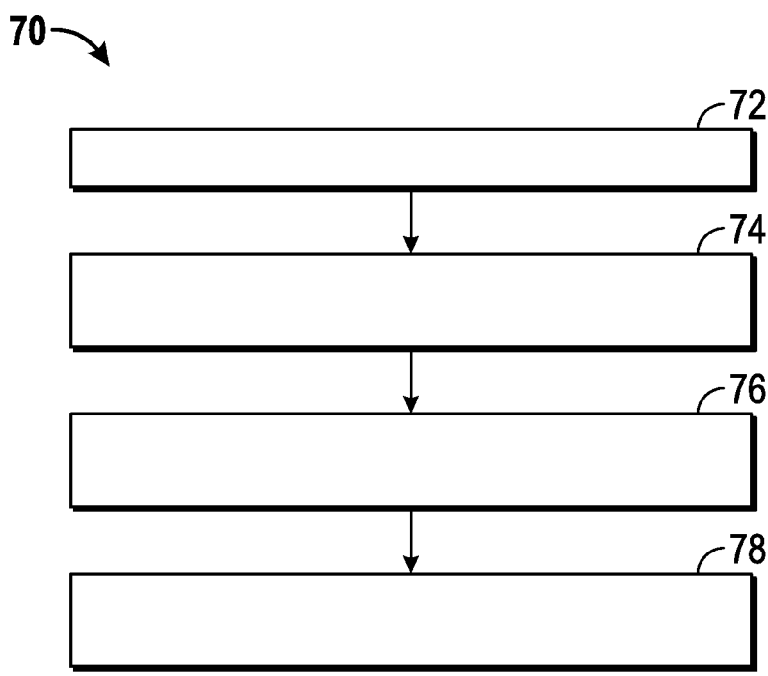
FIG. 5 is a flow diagram of a third embodiment of the speech adaptation and generation system.

FIG. 5 is a flow diagram 70 of a third example of how the speech recognition and generation system 40 operates. At box 72 a search query is made by the user. The system 40 compares words in the search results to the baseline dictionary at box 74, and new words that are not yet in the baseline dictionary are added by the dictionary adaptation module 42 to modify the baseline dictionary at box 76. The modified baseline dictionary is thereafter available for use by the system 40 at box 78.

In the case of updating a social network status, for example, when a status dictation is made the system may search for OOV words in the status of those persons, businesses, etc., that are associated with the use. For example, the status of friends, colleagues, family members, etc. may be searched by the system 40 for OOV words. If there are words and/or names that were not known to the speech recognition and generation system 40, those OOV words may be added such that they are available for the next status dictation.

Figure 6:
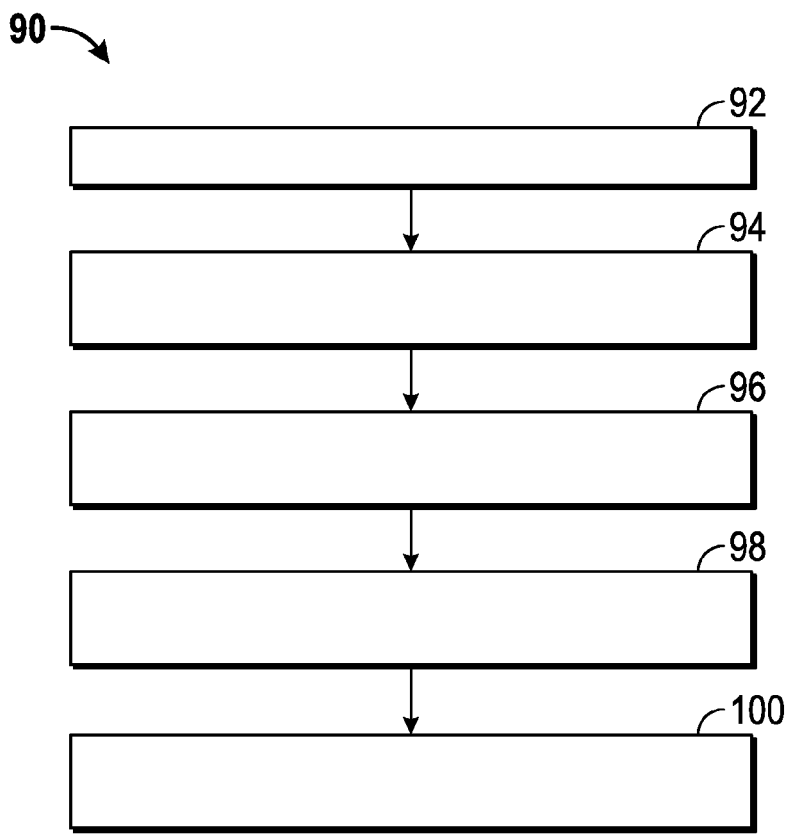
FIG. 6 is a flow diagram of a fourth embodiment of the speech adaptation and generation system.

FIG. 6 is a flow diagram 90 of a fourth example of how the speech recognition and generation system 40 operates. At box 92 a status dictation is made by the user. The system 40 searches for OOV words and/or names in statuses that are associated with the status of the user at box 94. The system 40 compares the words and/or names to the baseline dictionary at box 96, and OOV words and/or names that are not yet in the baseline dictionary are added by the dictionary adaptation module 42 to modify the baseline dictionary at box 98. The modified baseline dictionary is thereafter available for use by the system 40 at box 100.

Some words may be tagged by the dictionary adaptation module 42 as special such that the words are only added sparingly. This approach can be used to handle occasions in which the cost of confusion is high. For example, the word "dude" may be tagged by the dictionary adaptation module 42 as special. The words that may be tagged as special are not limited to slang terms. Any words that deviate from an expected level of politeness, for example, may be tagged as special. The list of words that may be tagged as special may be a predefined set of words or may be generated online. The word "dude", for example, would not appear in a baseline dictionary for two main reasons: (1) The likelihood of this word to appear is not high; and (2) The cost of dictating another word and mistakenly sending the word "dude" may be high. Note, however, if the user uses the word "dude" in many of his interactions the word "dude" may be added to all future interactions. In the case of the word "dude" and similar words, this word may only be added to the baseline dictionary by the dictionary adaptation module 42 after the word has already been used between the receiver and sender several times. The added words are per participants of the conversation in a broad sense, meaning the words may be added to conversation(s) between two persons, or may be defined for several persons that are communicating among themselves about the same subject.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for adapting a speech recognition and generation system, said method comprising:
    providing a speech recognition and generation engine that processes speech received from a user;
    providing a dictionary adaptation module that adds words to a baseline dictionary of the speech recognition and generation system by extracting words and adding out of vocabulary words to the baseline dictionary of the speech recognition and generation system; and
    comparing words from an incoming message with sets of word groups in the dictionary and adding new groups of words that are not in the dictionary, said new groups of words being from a list of new words that are related to the words from the incoming message and predefined based on a subject of a message exchange that includes the incoming message, and where the out of vocabulary words are only added for conversations between a sender and a receiver of the incoming message that have used the extracted words a predetermined number of times.

2. The method according to claim 1 wherein the dictionary adaptation module uses past incoming messages and the identity of a person or system the user of the speech recognition and generation system is communicating with to extract and add out of vocabulary words to the dictionary of the speech recognition and generation system.

3. The method according to claim 1 wherein the dictionary adaptation module uses search results from a user's internet search query to add out of vocabulary words to the dictionary of the speech recognition and generation system.

4. The method according to claim 1 wherein the dictionary adaptation module searches for out of vocabulary words and names in social network statuses that are associated with the user's social network status.

5. The method according to claim 1 wherein the added words are available for use when dictating outgoing messages.

6. The method according to claim 1 further comprising tagging words that are likely to be confused with other words such that the words are added to the dictionary sparingly.

7. A controls unit for adapting a speech recognition and generation system, said controls unit comprising:
    a speech recognition and generation engine that processes speech received from a user; and
    a dictionary adaptation module that extracts words or classes of words during communication, said module adding out of vocabulary words or classes of out of vocabulary words to a baseline dictionary of the speech recognition and generation system in a predetermined manner, including comparing words from an incoming message with sets of word groups in the dictionary and adding new groups of words from a list of new words that are related to the words from the incoming message that are not in the dictionary, said list of new words being predefined based on a subject of a message exchange that includes the incoming message, where the out of vocabulary words are only added for conversations between a sender and a receiver of the incoming message that have used the extracted words a predetermined number of times.

8. The controls unit according to claim 7 wherein the dictionary adaptation module uses past incoming messages and the identity of a person or system that the user of the speech recognition and generation system is communicating with to add out of vocabulary words to the baseline dictionary of the speech recognition and generation system.

9. The controls unit according to claim 7 wherein the dictionary adaptation module uses search results from a user's internet search query to add out of vocabulary words to the dictionary of the speech recognition and generation system.

10. The controls unit according to claim 7 wherein the dictionary adaptation module searches for out of vocabulary words and names in social network statuses that are associated with the user's social network status.

11. The controls unit according to claim 7 wherein the added words are available for use when dictating outgoing messages.

12. The controls unit according to claim 7 further comprising tagging words that are likely to be confused with other words such that the words are added to the dictionary sparingly.

13. A controls unit for adapting a speech recognition and generation system, said controls unit comprising:
    a speech recognition or generation engine that determines words uttered by a user to create a message; and
    a dictionary adaptation module that extracts words or classes of words that are encountered in a message to the user, said module adding out of vocabulary words or the classes of out of vocabulary words in a predetermined manner, further comprising comparing words from the incoming message with sets of related word groups in the dictionary and adding a list of new words to the dictionary that are related to the words from the incoming message, said list of new words being predefined based on a subject of a message exchange that includes the incoming message, wherein the out of vocabulary words may be tagged such that the out of vocabulary words are added to a dictionary of the speech recognition and generation engine only after the extracted words have been used between a sender and a receiver a predetermined number of times, and wherein the out of vocabulary words are only added for conversations between the sender and the receiver that have used the extracted words the predetermined number of times.

14. The controls unit according to claim 13 wherein the dictionary adaptation module uses past incoming messages and the identity of a person or system that the user of the speech recognition and generation system is communicating with to add out of vocabulary words to the baseline dictionary of the speech recognition and generation system.

15. The controls unit according to claim 13 wherein the added words are available for use when dictating outgoing messages.

16. The controls unit according to claim 13 wherein the dictionary adaptation module uses search results from a user's internet search query to add out of vocabulary words to the dictionary of the speech recognition and generation system.

17. The controls unit according to claim 13 wherein the dictionary adaptation module searches for out of vocabulary words and names in social network statuses that are associated with the user's social network status.

* * * * *